US009842562B2

(12) United States Patent
Hong et al.

(10) Patent No.: US 9,842,562 B2
(45) Date of Patent: Dec. 12, 2017

(54) DYNAMIC ZONE PLATE AUGMENTED VISION EYEGLASSES

(71) Applicant: QUALCOMM Incorporated, San Diego, CA (US)

(72) Inventors: John H. Hong, San Clemente, CA (US); Jian J. Ma, San Diego, CA (US); Chong U. Lee, San Diego, CA (US); Tallis Y. Chang, San Diego, CA (US); Jay C. Yun, San Diego, CA (US); Robert Sean Daley, Del Mar, CA (US); Frederick D. Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 684 days.

(21) Appl. No.: 13/740,219

(22) Filed: Jan. 13, 2013

(65) Prior Publication Data

US 2014/0198128 A1    Jul. 17, 2014

(51) Int. Cl.
*G09G 5/00* (2006.01)
*G02B 26/10* (2006.01)
(Continued)

(52) U.S. Cl.
CPC ............. *G09G 5/00* (2013.01); *G02B 26/106* (2013.01); *G02B 27/0172* (2013.01);
(Continued)

(58) Field of Classification Search
CPC ............... G02B 27/46; G02B 27/0172; G02B 2027/0127; G02B 26/106;
(Continued)

(56) References Cited

U.S. PATENT DOCUMENTS 5,499,138 A * 3/1996 Iba ...................... G02B 3/0043
                                                     345/8
6,522,794 B1    2/2003 Bischel et al.
(Continued)

FOREIGN PATENT DOCUMENTS

CN   102754014 A   10/2012
CN   102866506 A    1/2013
(Continued)

OTHER PUBLICATIONS

International Search Report and Written Opinion—PCT/US2014/011127—ISA/EPO—Apr. 29, 2014.
(Continued)

*Primary Examiner* — Gregory J Tryder
*Assistant Examiner* — Kwang Lee
(74) *Attorney, Agent, or Firm* — QUALCOMM Incorporated

(57) ABSTRACT

A method, an apparatus, and a computer program product for modulating optics in a display are provided. An apparatus forms a plurality of zone plates in a liquid crystal using electric fields. Each zone plate has a center, and the centers are aligned along a first axis of the display. The apparatus moves the plurality of zone plates in a first direction along a second axis of the display different from the first axis of the display, while maintaining alignment of the centers of the plurality of zone plates along the first axis. Such movement is provided through repositioning of electric fields through the liquid crystal.

40 Claims, 10 Drawing Sheets

(51) Int. Cl.
*G02C 7/10* (2006.01)
*G02C 7/08* (2006.01)
*G02F 1/1343* (2006.01)
*G02F 1/29* (2006.01)
*G02B 27/01* (2006.01)

(52) U.S. Cl.
CPC ............ *G02C 7/083* (2013.01); *G02C 7/101* (2013.01); *G02F 1/134309* (2013.01); *G02B 2027/0127* (2013.01); *G02B 2027/0147* (2013.01); *G02B 2027/0178* (2013.01); *G02F 2001/294* (2013.01)

(58) Field of Classification Search
CPC .......... G02B 2027/0178; G02B 27/017; G02B 2027/0134; G02B 2027/0147; G02C 7/16; G02C 7/083; G02F 1/134309; G02F 2001/294; G09G 5/00; G06F 3/016; H04N 5/14; H04N 13/0022; G01B 2290/45
USPC ........................................................ 345/633
See application file for complete search history.

(56) References Cited

U.S. PATENT DOCUMENTS

| 7,408,609 | B2 | 8/2008 | Yanagawa et al. | |
| 8,866,702 | B1 | 10/2014 | Wong et al. | |
| 2004/0108971 | A1* | 6/2004 | Waldern et al. | 345/8 |
| 2009/0051863 | A1 | 2/2009 | Meisner | |
| 2010/0026920 | A1* | 2/2010 | Kim | H04N 13/0404 349/15 |
| 2011/0019111 | A1* | 1/2011 | Morikawa et al. | 349/2 |
| 2011/0228181 | A1* | 9/2011 | Jeong | G02B 5/1842 349/15 |
| 2012/0154880 | A1 | 6/2012 | Wu et al. | |
| 2013/0286053 | A1* | 10/2013 | Fleck et al. | 345/690 |
| 2013/0314649 | A1* | 11/2013 | Choi | G02B 27/2214 349/96 |
| 2016/0018657 | A1 | 1/2016 | Hong et al. | |

FOREIGN PATENT DOCUMENTS

| EP | 0981065 | A2 | 2/2000 |
| JP | 2002357804 | A | 12/2002 |
| JP | 2008052177 | A | 3/2008 |
| JP | 2009251236 | A | 10/2009 |
| WO | 9300045 | A1 | 1/1993 |

OTHER PUBLICATIONS

Invision, Inc. LCD Breakaway, web page, "Liquid crystal displays used in modern portable computers fall into two main types: "active" matrix (a.k.A. TFT) and "passive" matrix (a.k.a. DSTN) . . . ," http://invisionsvc.com/Services/Computer%20Displays/LCD%20Breakaway.html, Aug. 17, 2012.

* cited by examiner

DYNAMIC ZONE PLATE AUGMENTED VISION EYEGLASSES

BACKGROUND

Field

The present disclosure relates generally to optic displays, and more particularly, to augmented vision eyeglasses having dynamically moving zone plates.

Background

Augmented vision eyeglasses, wherein synthesized images, such as text and symbols, are overlaid onto natural visual fields in an eyeglass package, are being touted as the next big thing for human computer interfaces. There is a fundamental optics problem of a big disparity in the focal parameters for the natural vision field, i.e., objects typically 12 inches or further away, and the overlay field, which is typically displayed on the eyeglass lens surface. Most solutions to date have bulky optics to fold the optical path length that is typically needed to solve the imaging problem. Such solutions display an overlay image as a two-dimensional (2D) collection of pixels and require the optics to form a virtual image at a far field distance (e.g., ≥12 inches), wherein the virtual image is subsequently reimaged by the eye lens onto the person's retina, through the eye lens. For example, in one solution, miniature liquid crystals are placed close on the eyeglass, with relay optics and a holographic coupler. These components operate together to overlay a synthetic image on the actual image being seen by the user. This solution involves a complex relay optical system and a display unit. Another problem associated with conventional augmented vision eyeglasses is the fact that people who wear prescription glasses require some adaptation of the optics to compensate for vision problems, such as near and far sightedness or astigmatism. Conventional solutions do not address this issue.

SUMMARY

In an aspect of the disclosure, a method, a computer program product, and an apparatus are provided. A method, an apparatus, and a computer program product for generating a retina image by modulating optics in a retina display are provided. An apparatus generates true retina images with one or a plurality of dynamic zone plates formed in a liquid crystal device using electric fields. The dynamic zone plate is able to dynamically change the position of its optical axis relative to the eye lens axis and rapidly forms an array of the focused spots on the retina of the eye. Rapidly updating one or a plurality of zone plates can lead to gapless image synthesis across the retina. To synthesize the 2D image on the retina, the apparatus sets an electric field in a first direction that determines one or multiple focused spots on the retina in the first direction. Simultaneously, the apparatus sets an electric field in a second direction and determines the focused spots on the retina in the second direction. By repeating this row by row rapidly, a 2D gapless image is formed on the retina.

To this end, an exemplary apparatus forms a plurality of zone plates in a liquid crystal using electric fields. Each zone plate has a center, and the centers are aligned along a first axis of the display. The apparatus also moves the plurality of zone plates in a first direction along a second axis of the display different from the first axis of the display, while maintaining alignment of the centers of the plurality of zone plates along the first axis. Such movement is provided through repositioning of electric fields through the liquid crystal.

DETAILED DESCRIPTION

Figure 1:
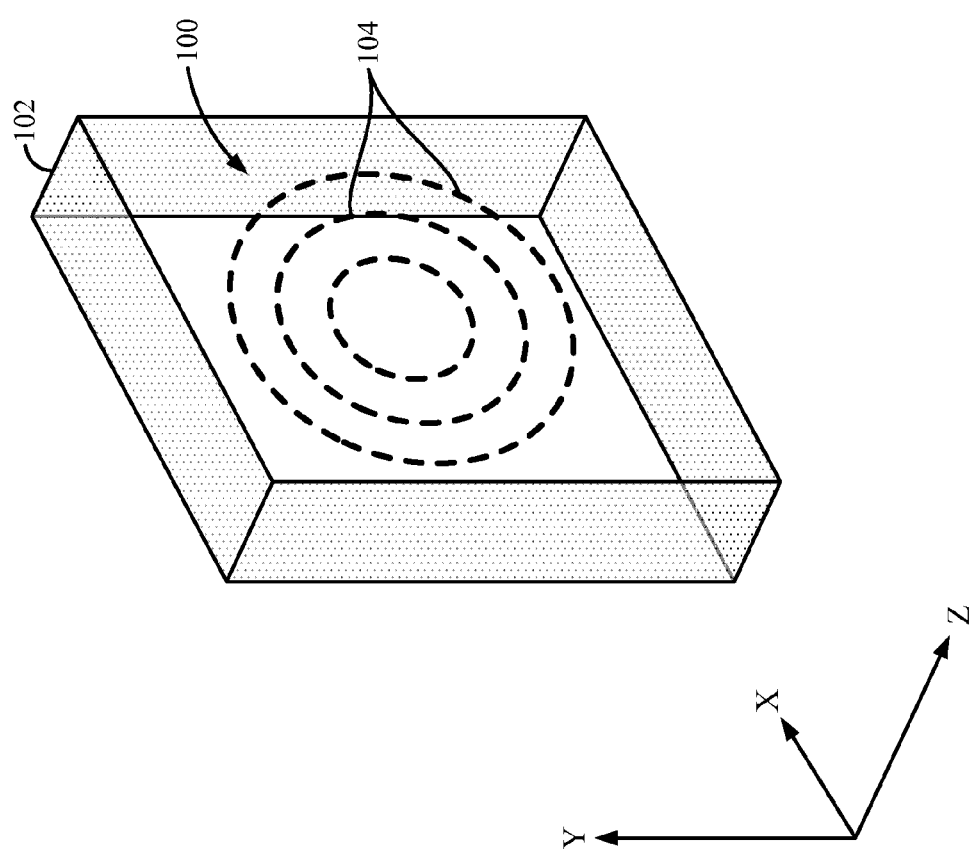
FIG. 1 illustrates a perspective view of a zone plate within a liquid crystal (liquid crystal) structure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of optics systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The optics display described herein essentially forms a series of zone plates on the lens surface of the eyeglass. A dynamic array of zone plates, allows light launched as a plane wave passing normally through the zone plate to be focused onto a corresponding array of spots across the retina. The zone plates can be varied to match the viewer's lens prescription, and also account for a possible curvature of the lens surface on which it resides. The zone plates need not be implemented all at once for the entire two-dimensional display of pixels. In fact, one row can be synthesized followed by the next row and so forth, as described further below. The receptors on the retina naturally have some retention so rapidly updating the zone plates can lead to gapless image synthesis across the retina.

The optics display described herein relies on one or more dynamically movable zone plates to create an image on a retina. A zone plate is essentially a flat lens. One type of zone plate is a Fresnel lens. A conventional Fresnel lens (not shown) has surface reliefs on it that form concentric circles. The surface relief pattern provides surface refraction properties that create the power of the lens. In operation, light rays go through the flat side of the lens. As the light exits the side with surface relief it is bent by the shape of the surface relief pattern.

The function of a zone plate is to take light coming in from the other side of the flat piece of glass. At this point, the light has no structure on it. It is just a monochromatic plane wave impinging on that zone plate from the other side of the glass. The zone plate takes a portion of that light and focuses it to a spot or focal point or retina.

With reference to FIG. 1, in accordance with the optics system disclosed herein, a zone plate 100 is created by forming Fresnel lens properties in liquid crystal glass 102 using electric field properties, as opposed to physical surface reliefs. The electric field induces density changes in the liquid crystal so that light going through the liquid crystal encounters dense regions where the refractory index is higher and other regions where the refractory index is lower. The combination of high and low index patterns, essentially form the concentric circles 104 of the Fresnel lens zone plate and provide the refractive properties of the lens.

Figure 2:
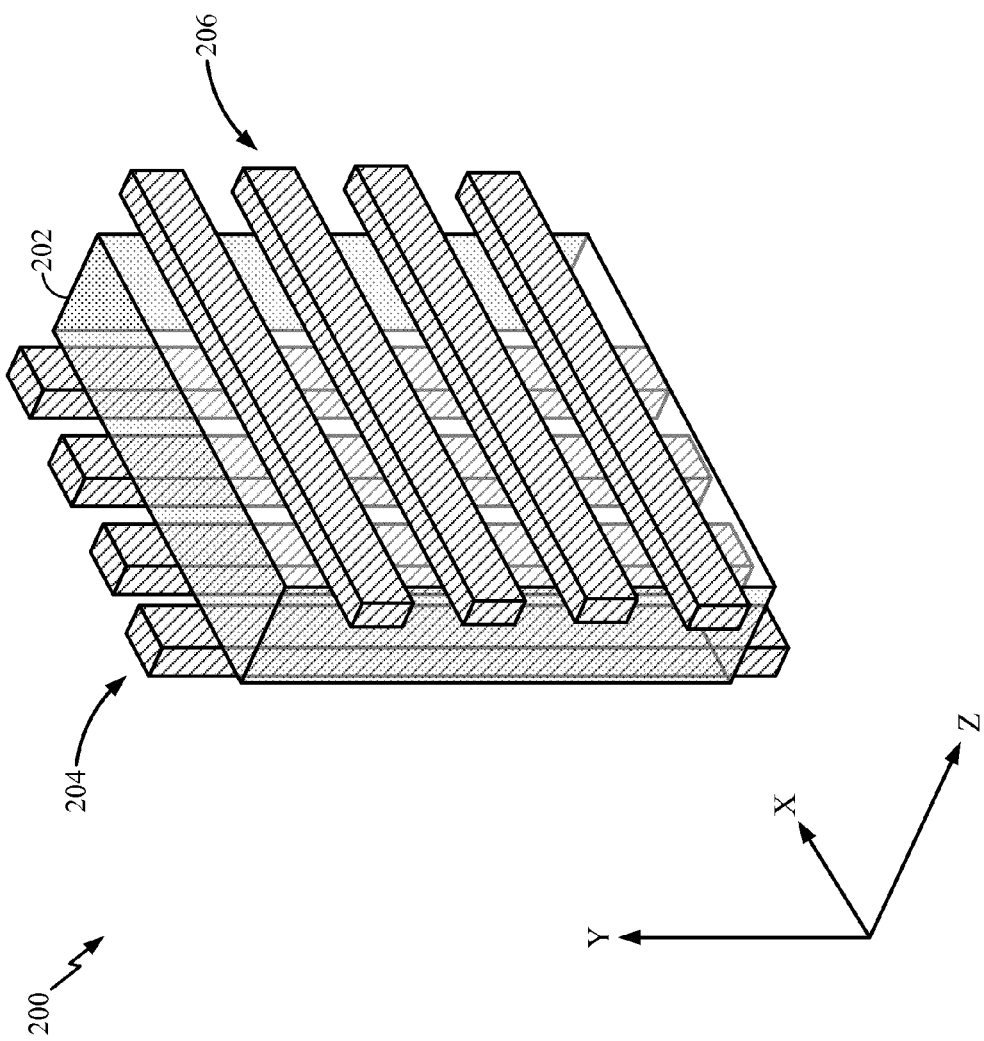
FIG. 2 illustrates a perspective view of a structure for forming zone plates within liquid crystal by the application of electric fields through the liquid crystal.

With reference to FIG. 2, a representative structure 200 for forming a zone plate like that of FIG. 1 includes a layer of liquid crystal 202 positioned between an array of vertically aligned, optically transparent finger electrodes 204 on one side of the liquid crystal 202 and an array of horizontally aligned, optically transparent finger electrodes 206 on the other side of the liquid crystal 202. For simplicity in illustration, only four vertical and four horizontal electrodes are shown. The vertical electrodes 204 and the horizontal electrode 206 work together to induce an electrical field through the liquid crystal 202. For example, in order to create a concentric circle like pattern of varying density within the glass, such activation may involve establishing DC voltage potentials between one or more vertical electrodes 204 and one or more horizontal electrodes 206. It may also involve dynamically selecting the vertical and horizontal electrodes to rapidly scan the focus spots column by column or row by row.

Figure 3:
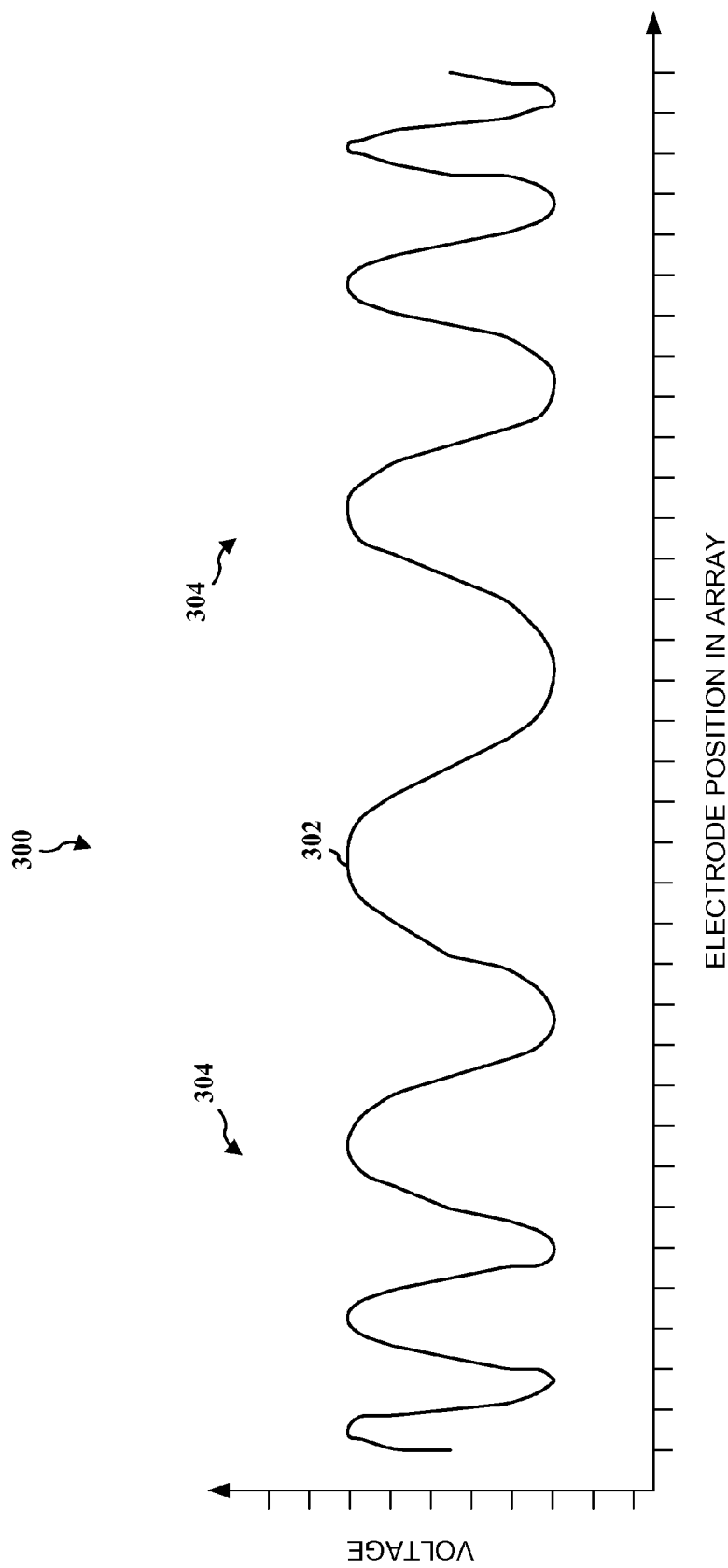
FIG. 3 illustrates a spatial chirp formed by plotting electrode array positions as a function of applied voltages.

With reference to FIG. 3, in one configuration, a set of voltages having varying DC values is applied to a number of electrodes in an array of spaced apart electrodes. Plotting points corresponding to electrodes along the array as a function of applied voltages and connecting the points forms a waveform characterized as a "spatial chirp." This characterization is evident in FIG. 3, which depicts a chirp waveform 300. The spatial chirp, also referred to herein as a "chirped sinusoid" or a "chirped distribution" includes a center peak 302 and side peaks 304 on two sides of the center peak. The distance between the peaks becomes smaller and smaller as it is away from the center peak.

Figure 4:
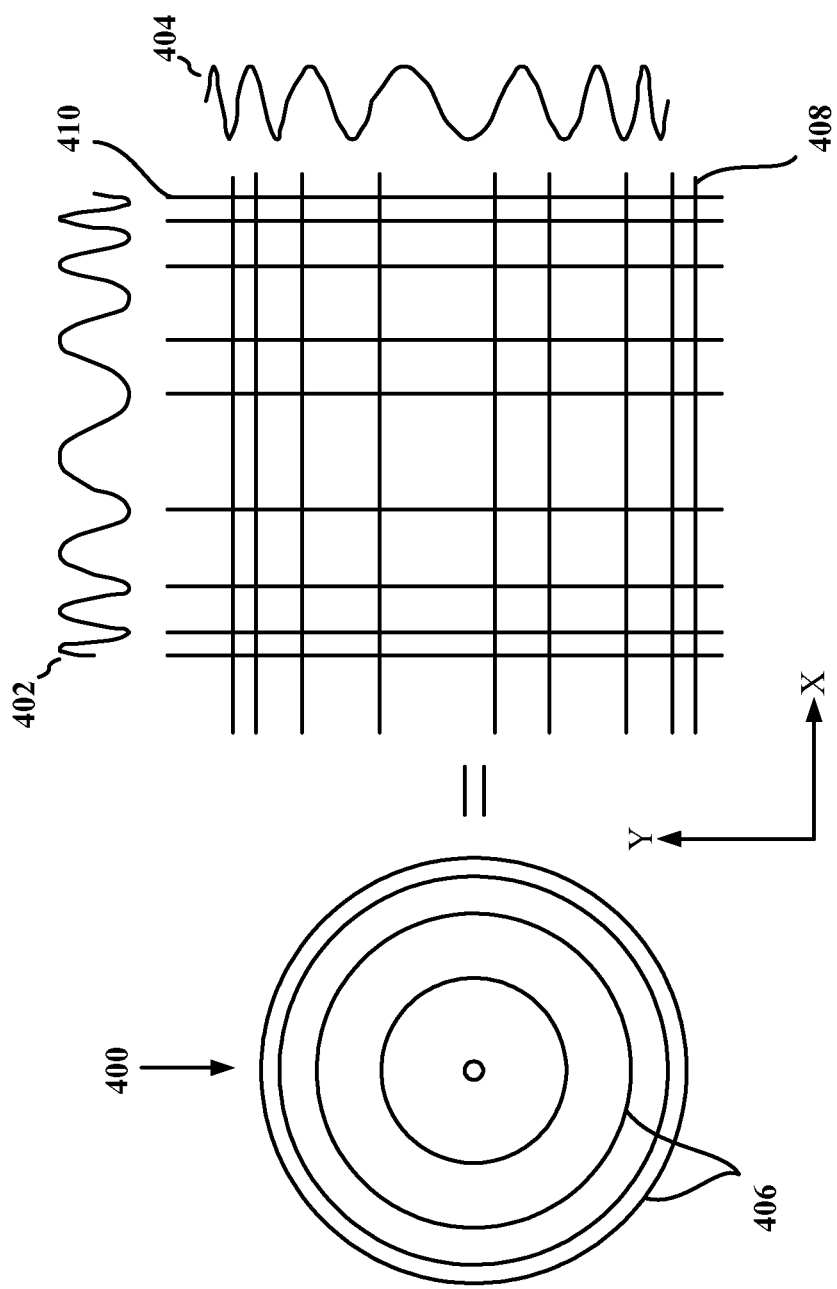
FIG. 4 illustrates a decomposition of a zone plate into an x component and y component.

With reference to FIG. 4, the zone plate 400 has a particular face pattern across a 2D surface. That pattern, however, can be separable into an x variation and a y variation. For example, a chirped sinusoid applied in the x direction, i.e., the upper horizontal chirp 402, that has a frequency that varies linearly across, produces a one dimensional image. Likewise, the same chirped sinusoid applied in the y direction, i.e., the right side vertical chirp 404, produces another one dimensional image. Multiplying these two one-dimensional zone plates together produces a two-dimensional zone plate 400 having concentric circles 406. When a plane wave normal to the zone plate passes through this zone plate, the light will be focused on a spot on the axis (a line normal to the zone plate and going through the center of the zone plate) of the zone plate at a distance determined by the property of the chirping.

Mathematically the zone plate 400 may be described by a circularly symmetric set of fringes and is separable into a product of fringes oriented along the x axis 408, also referred to as horizontal fringes, and fringed oriented along the y axis 410, also referred to vertical fringes. This has an important implication in terms of how the display is implemented. Because of this separability property, the electrode pixel structure need not be a 2D array but can be synthesized as a concatenation of two one-dimensional (1D) arrays. The horizontal fringe 408 component of the zone plate 400 ensures focusing onto any particular row and the vertical fringe(s) 410 component of the zone plate 400 picks out the particular column(s) onto which light is focused. An array of imaged pixels is formed row by row, by applying the chirp 404 and successively moving the center of the chirp down the y axis. The x-axis oriented zone plates cause the display dependent pixels to be imaged onto particular locations for a given row.

Figure 5:
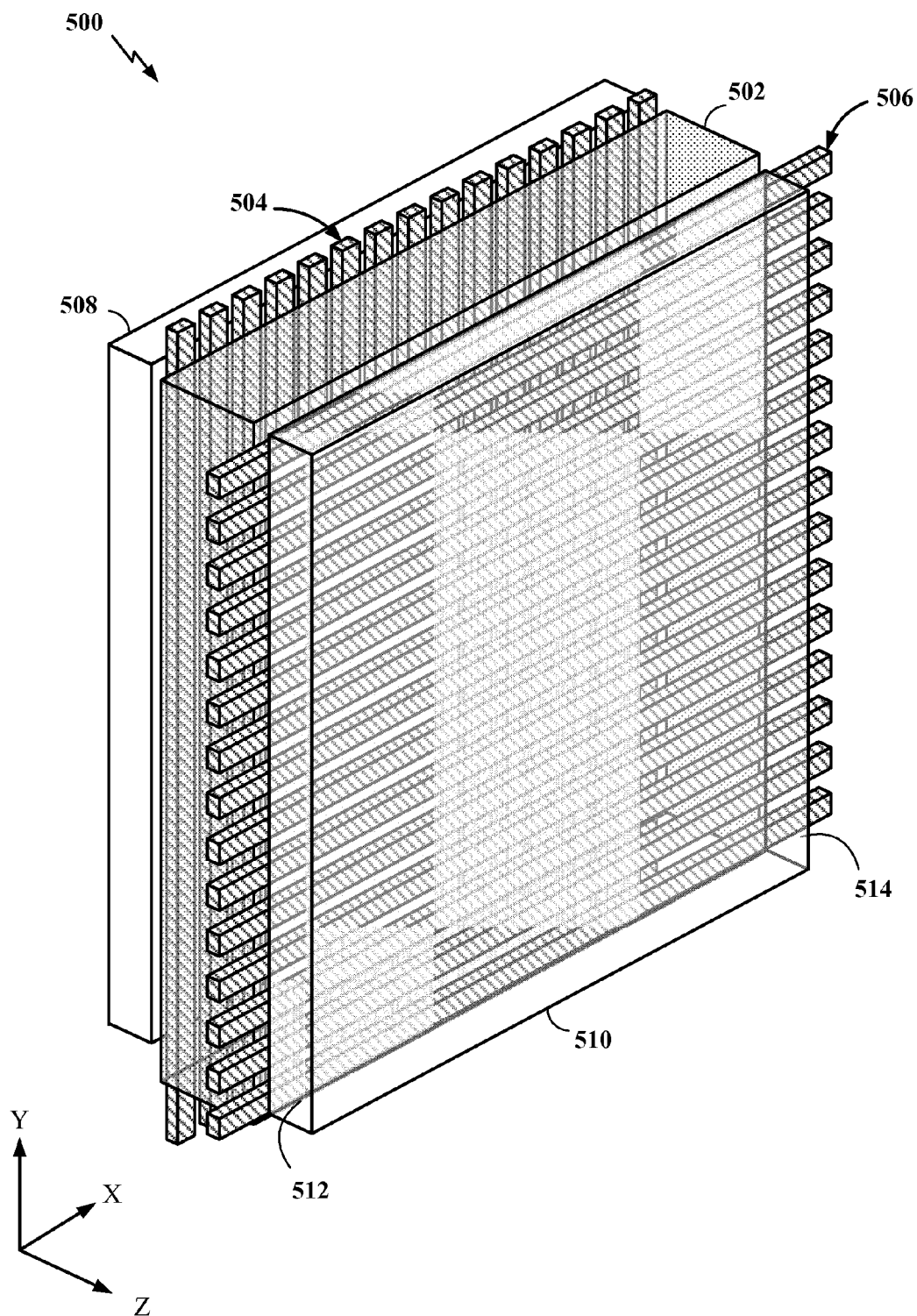
FIG. 5 illustrates a perspective view of an optics display with dynamic zone plate capability.
Figure 6A:
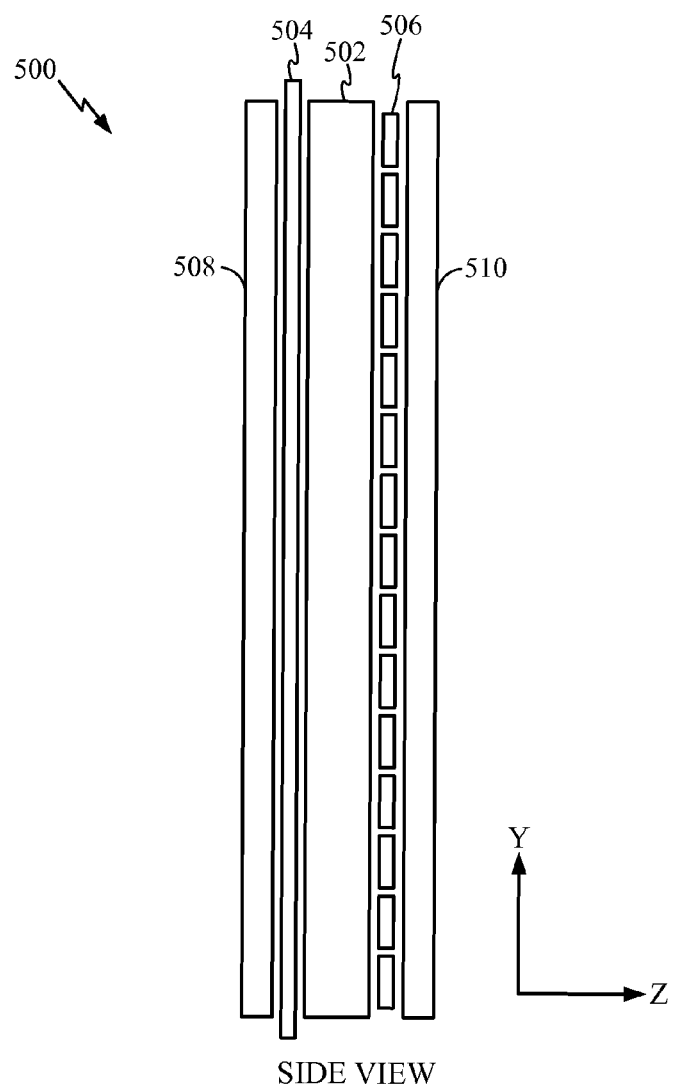
FIG. 6A illustrates a side view of the display of FIG. 5 taken along the y-z axis.
Figure 6B:
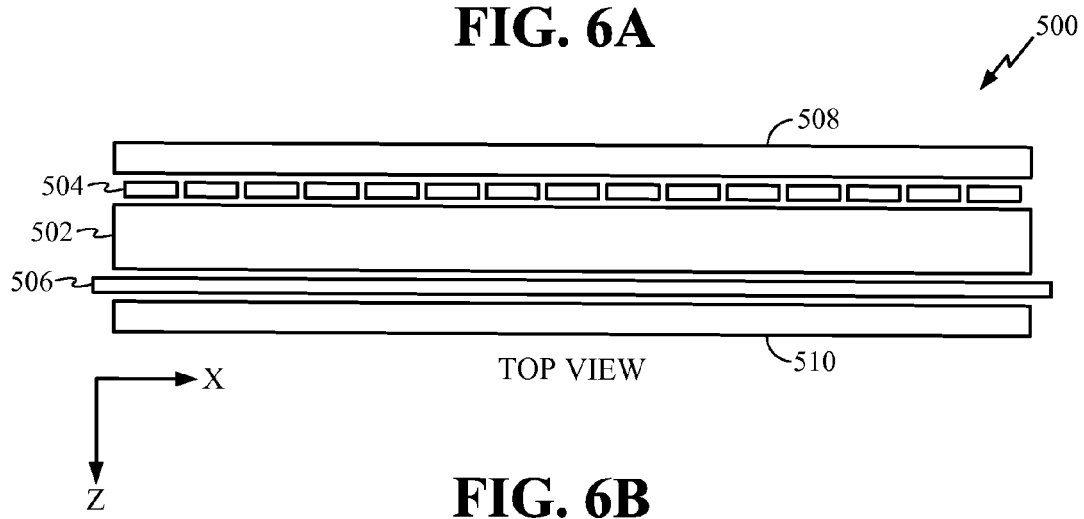
FIG. 6B illustrates a top view of the display of FIG. 5 taken along the x-z axis

With reference to FIGS. 5, 6A and 6B, an optics system forming a display 500 includes a layer of liquid crystal 402 positioned between an array of vertically aligned, optically transparent finger electrodes 504 on one side of the liquid crystal 502 and an array of horizontally aligned, optically transparent finger electrodes 506 on the other side of the liquid crystal 502. While the foregoing components are typically in abutting contact, FIGS. 6A and 6B show spacing between components for drawing clarity. The electrodes are substantially transparent in the visible spectrum and do not have optical properties that affect light passing through the display. The vertical electrodes 504 are connected to a column driver (not shown to maintain figure clarity) that controls activation of the vertical electrodes. The horizontal electrodes 506 are connected to a row driver (not shown to maintain figure clarity) that controls activation of the horizontal electrodes. The electrodes may be coated with an optically transparent and electrically non-conductive material for isolating the electrodes and optically hiding them.

As explained further below, the vertical electrodes 504 and the horizontal electrodes 506 work together to induce an electrical field through the liquid crystal 502. To this end, activation of the electrodes may involve establishing a DC voltage potential between a vertical electrode 504 and a horizontal electrode 506. Activation may also involve establishing a DC voltage potential between a single vertical electrode 504 and a plurality of horizontal electrodes 506 or between a single horizontal electrode 506 and a plurality of vertical electrodes 504.

With continued reference to FIG. 5, the optics system further includes an input polarizer 508 on the backside of the display and a surface glass 510 on the front side of the display. The display also includes an optional front light with light source, e.g., LED, coupled into the left edge 512 of the glass 510. The light is guided by glass from the left edge 512 to the right edge 514. Along the way, the light encounters a refractive pattern, e.g., fine scratches, in the glass 510 that directs a part of that guided light to leak out normal to the surface of the glass. These scratches basically turn part of the light 90 degrees from within the plane to normal out of the plane. Front light illumination is not necessary if there is ambient light. The dynamic zone plane is able to use part of the ambient light as the illumination source to form the retina images.

The redirected light from the edge of the glass couples with light that is coming out through the liquid crystal 502, through the zone plates. Both sources of light, the light from the edge and the light from the liquid crystal, get focused on the retina.

Figure 7A:
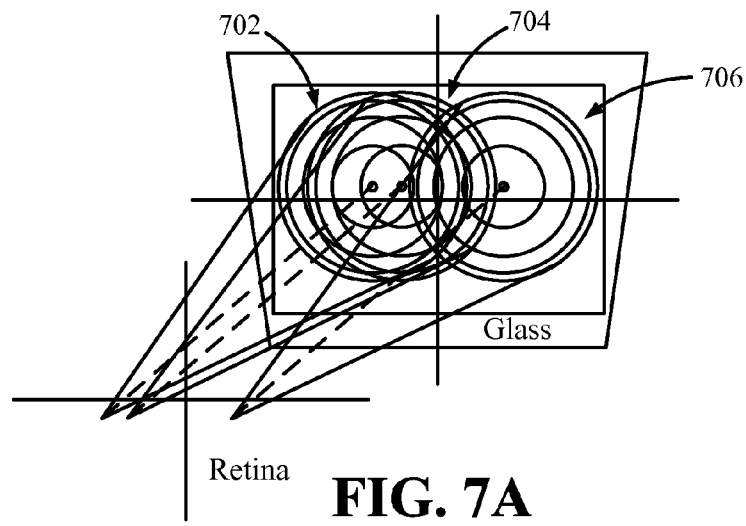
FIGS. 7A, 7B and 7C illustrate progressive vertical and horizontal movement of overlapping zone plates on a display.
Figure 7B:
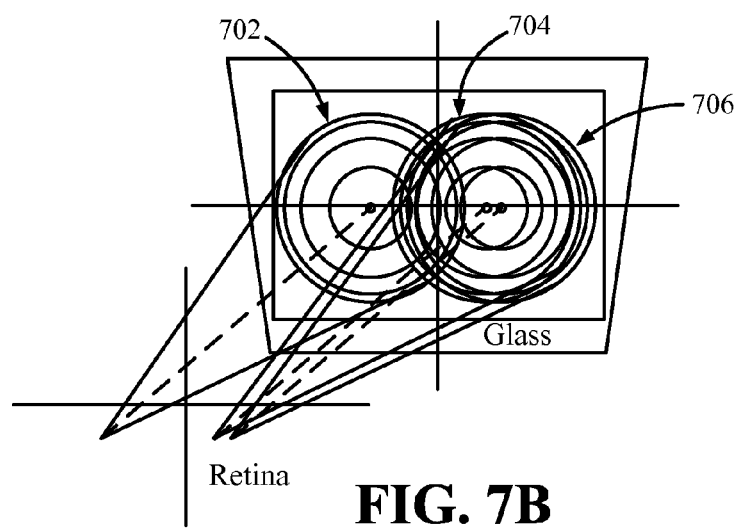
Figure 7C:
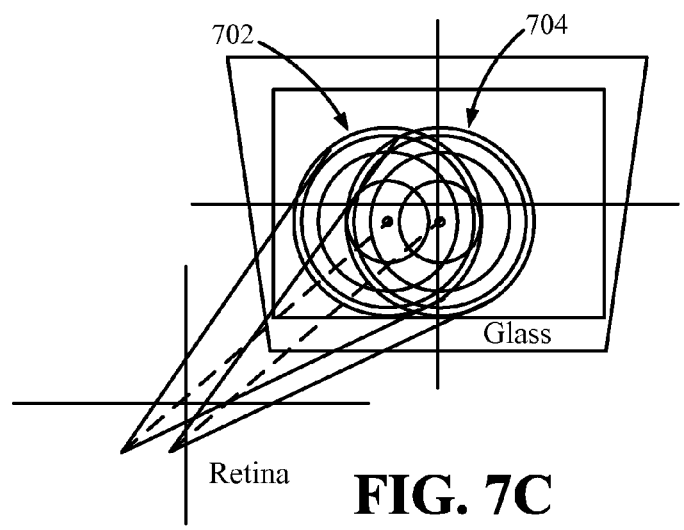

With reference to FIGS. 7A, 7B and 7C, a series of diagrams illustrate dynamic movement of zone plates partially overlapped or superimposed on top of each other in two directions on a display 708, in a raster scan type operation, wherein the zone plates are refreshed and moved vertically one pixel at a time. As described above, the zone plates are formed by electric fields created in liquid crystal. The function of the zone plates is to take a portion of light coming in from the other side of the display and focus it to a retina. When the center of a zone plate is moved over, laterally on the piece of glass, the focus spot on the retina moves with it. Multiple zone plates produce multiple points and define a spatial distribution of points that can be formed on a retina.

With reference to FIG. 7A, three zone plates 702, 704, 706 are formed by applying three separate chirps to three sets of the vertical electrodes, and by applying a single chirp to the horizontal electrodes having a chirp distribution centered at one of the horizontal electrodes. The chirps applied to the vertical electrodes have some spatial shift in relation to each other. Because the center of the chirp distribution is applied only to one of the horizontal electrodes, the centers of the zone plates are collinear along a horizontal line on the display all along the same row. Therefore the spot they form on the retina also lie on a single horizontal line or row on the retina.

With reference to FIG. 7B, the centers of the zone plates are displaced horizontally by applying three different chirps to three different sets of vertical electrodes. The zone plates are also displaced vertically by applying a chirp to the horizontal electrodes such that the entire chirp distribution is shifted down one row, thereby placing the center of the chirp distribution at the horizontal electrode that is one below the horizontal electrode that previously had a chirp center applied to it. As such, the display moves vertically down by one row or one pixel on the retina.

With reference to FIG. 7C, the zone plates are displaced even further down by one pixel. This may be repeated, on a row-by-row basis, for the entire display by driving the vertically oriented electrodes with the appropriate chirps to control the horizontal position of the focal points and the horizontally oriented electrodes to control the vertical position of the focal points. Application of the dynamic zone plates described herein may be expanded to accommodate a person's vision characteristics. Through the application of particular chirped distributions, a zone plates may be locally perturbed to impart an additional power to take away power to adapt for a person eye prescription.

Figure 8:
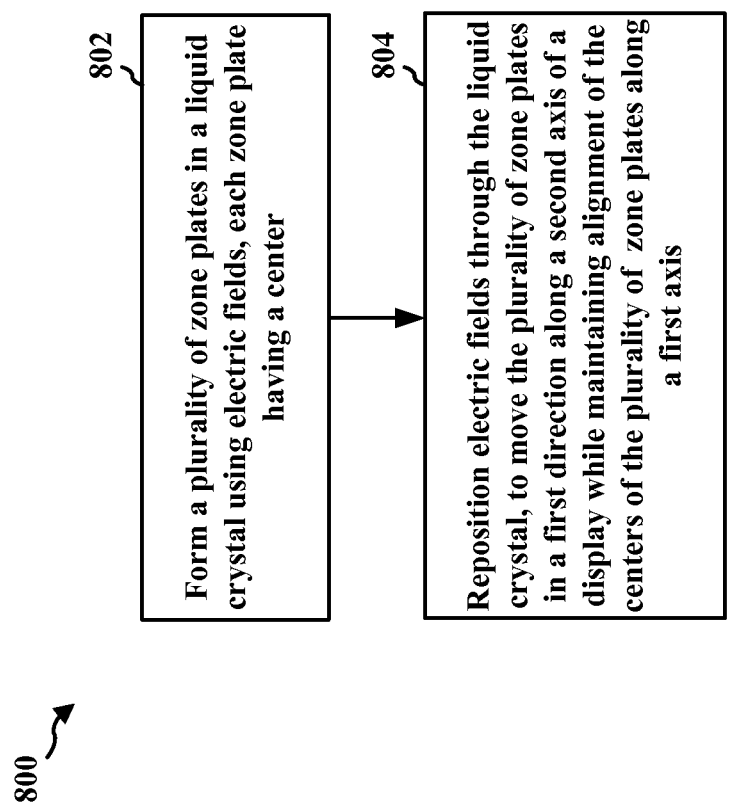
FIG. 8 is a flow chart of a method of modulating optics through dynamic zone plate movement.

FIG. 8 is a flow chart 800 of a method of modulating optics through dynamic movement of zone plates. The method may be performed by a liquid crystal apparatus. At step 802, the apparatus forms a plurality of zone plates in a liquid crystal using electric fields. Each zone plate has a center and the centers are aligned along a first optical axis of the plate. The optical axis of each zone plate determines the location of image pixels on eye retina. The zone plates may be formed by establishing electric fields between a plurality of electrode sets on a first side of the liquid crystal and an electrode set on a second side of the liquid crystal. One way of establishing these electric fields is to apply a set of voltages of varying values to each of the plurality of electrode sets on the first side, and a set of voltages of varying values to the electrode set on the second side.

At step 804, the apparatus moves the plurality of zone plates in a first direction along a second axis of the display different from the first axis of the display, while maintaining alignment of the centers of the zone plates along the first axis. Such movement is provided by repositioning electric fields through the liquid crystal. In one configuration, each set of voltages applied to an electrode set defines a chirp distribution having a center corresponding to a first-side center electrode, in the case of voltages applied to electrode sets on the first side, or a second-side center electrode in the case of voltages applied to the electrode set on the second side. The intersections of each first-side center electrode and the second-side center electrode define a respective center for one of the zone plates.

The zone plates are moved by shifting at least one of the chirp distributions applied to an electrode set on the first side so that the corresponding first-side center electrode changes, while maintaining the chirp distribution applied to the electrode set on the second side so that the second-side center electrode is unchanged. This maintains alignment of the zone plates along one axis of the display. For example, if the first axis is the horizontal axis of the display, and the second axis is the vertical axis, the zone plates may move together vertically, while their centers remain aligned horizontally. To accomplish such vertical movement, the plurality of zone plates may be moved by shifting the chirp distributions applied to the electrode set on the second side so that the corresponding second-side center electrode changes. In one configuration, the chirp center is shifted one electrode from the current electrode. Alternatively, or in addition, one or more zone plates may move horizontally across the display by shifting one or more respective chirp distribution along the array of vertically arranged finger electrodes.

Figure 9:
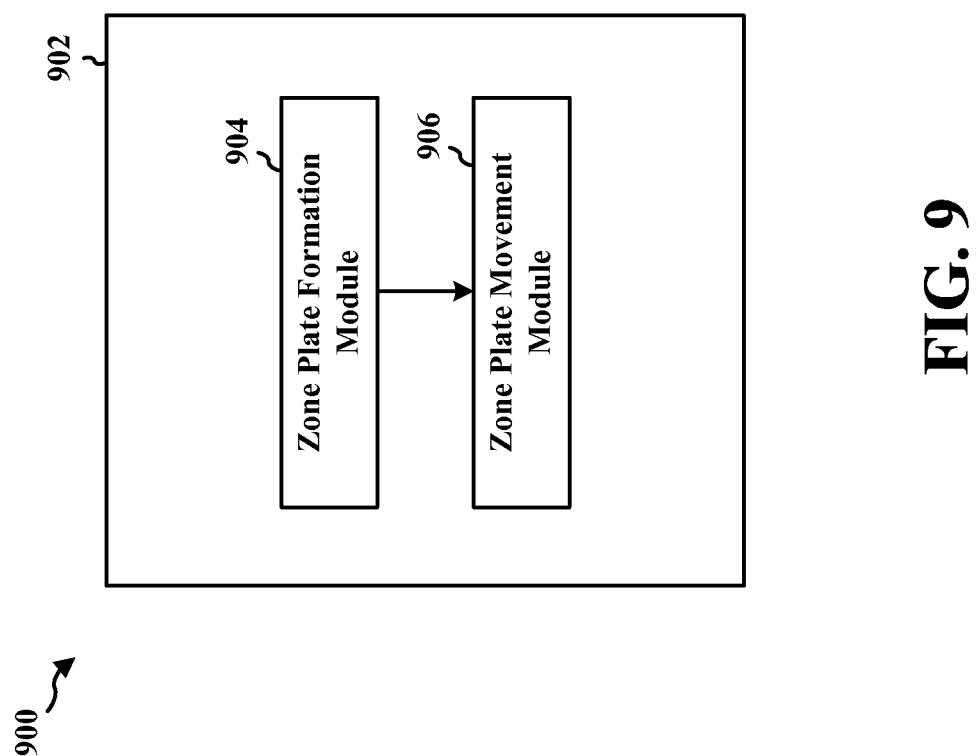
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a display. The apparatus includes a zone plate formation module 904 that forms a plurality of zone plates in a liquid crystal using electric fields. Each zone plate has a center, and the centers are aligned along a first axis of the display. The apparatus also includes a zone plate movement module 906 that moves the plurality of zone plates in a first direction along a second axis of the display different from the first axis of the display, while maintaining alignment of the centers of the zone plates along the first axis. Such movement is implemented by repositioning electric fields through the liquid crystal. In some configurations, the zone plate formation module may also control the focusing power of the zone plates to accommodate for a vision correction need of a user of the display, for example, by applying customized chirp distributions to one or more sets of electrodes.

The apparatus may include additional modules that perform each of the steps of the algorithm in the aforementioned flow chart of FIG. 8. As such, each step in the aforementioned flow charts of FIG. 8, and the further details of these steps as described herein, may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
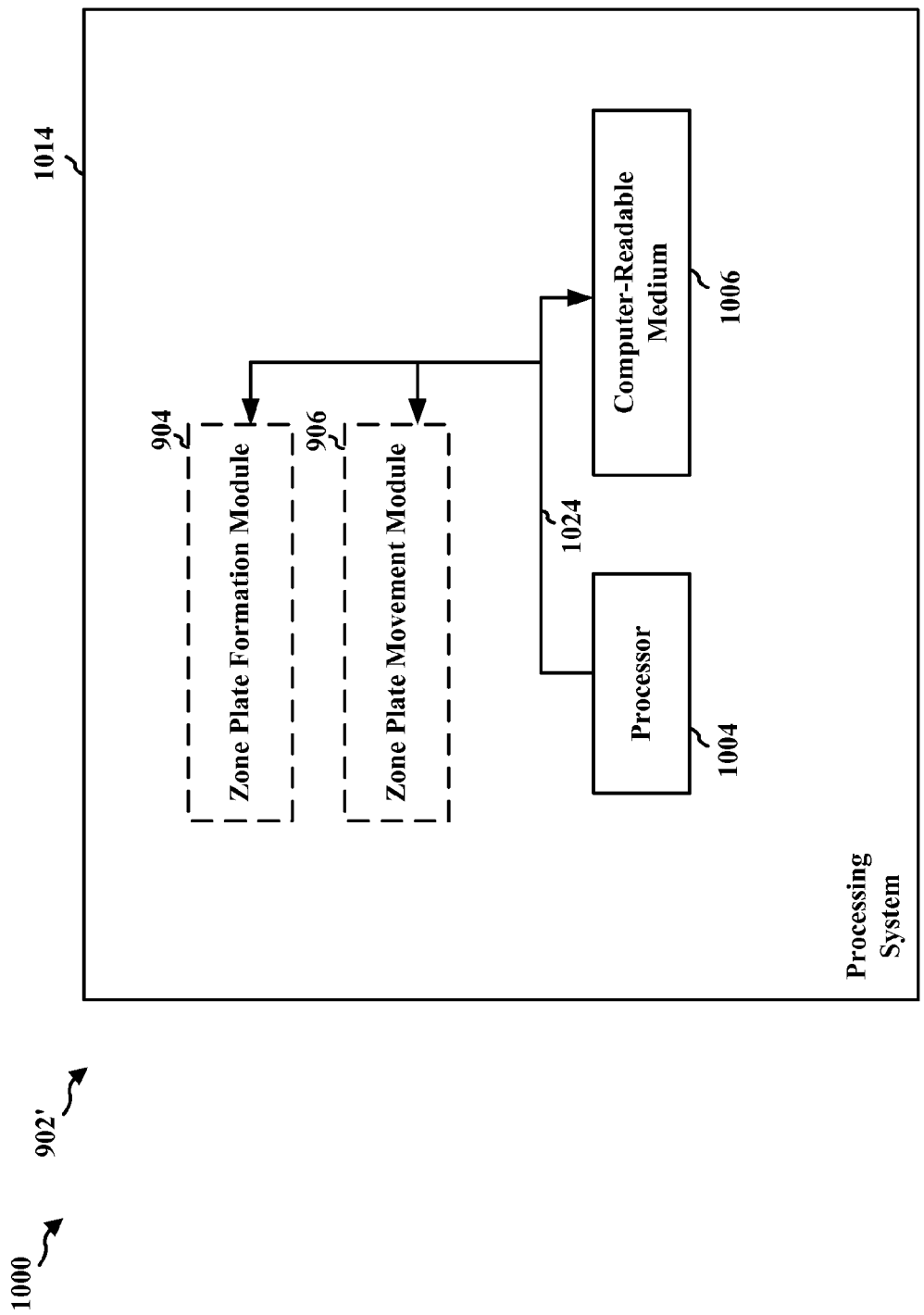
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904 and 906. The modules may be software modules running in the processor 1004, resident/stored in the computer readable medium 1006, one or more hardware modules coupled to the processor 1004, or some combination thereof.

In one configuration, the display apparatus 902/902' includes means for forming a plurality of zone plates in a liquid crystal using electric fields. Each zone plate has a center and the centers are aligned along a first axis of the display. In one configuration, the means for forming the zone plates includes means for establishing electric fields between a plurality of electrode sets on a first side of the liquid crystal and an electrode set on a second side of the liquid crystal. The apparatus 902/902' also includes means for moving the plurality of zone plates in a first direction along a second axis of the display different from the first axis of the display, while maintaining alignment of the centers of the zone plates along the first axis. Such movement is provided by repositioning electric fields through the liquid crystal. The aforementioned means may be one or more of the aforementioned modules of the apparatus 902 and/or the processing system 1014 of the apparatus 902' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of generating a retina image by modulating optics in a retina display having a liquid crystal plate, comprising:

establishing electric fields between a plurality of electrode sets on a first side of the liquid crystal plate and an electrode set on a second side of the liquid crystal plate to form a plurality of circular zone plates in the liquid crystal plate, each zone plate having a center, wherein the centers of the plurality of zone plates are aligned along a first axis of the display, and the centers of the plurality of zone plates are offset from each other relative to a second axis of the display different from the first axis of the display such that at least two of the plurality of zone plates at least partially overlap; and moving, by repositioning electric fields through the liquid crystal plate, the plurality of zone plates in a first direction along the second axis of the display while maintaining alignment of the centers of the plurality of zone plates along the first axis.

2. The method of claim 1, wherein the electrodes of the plurality of electrode sets on the first side are substantially orthogonal to the electrodes of the electrode set on the second side.

3. The method of claim 1, wherein establishing electric fields comprises:
applying a set of voltages of varying values to each of the plurality of electrode sets on the first side; and
applying a set of voltages of varying values to the electrode set on the second side.

4. The method of claim 3, wherein:
each set of voltages applied to an electrode set defines a chirp distribution having a chirp center corresponding to a voltage applied to a first-side center electrode, in the case of voltages applied to electrode sets on the first side, or a voltage applied to a second-side center electrode in the case of voltages applied to the electrode set on the second side; and
the intersection of the first-side center electrode and the second-side center electrode defines a respective center for one of the plurality of zone plates.

5. The method of claim 4, wherein moving the plurality of zone plates comprises:
shifting at least one chirp distribution applied to an electrode set on the first side so that a corresponding first-side chirp center changes, while maintaining the chirp distribution applied to the electrode set on the second side so that the second-side chirp center is unchanged.

6. The method of claim 4, wherein moving the plurality of zone plates comprises shifting the chirp distribution applied to the electrode set on the second side so that the second-side chirp center changes.

7. The method of claim 1, wherein the zone plates are moved at time intervals sufficient to form a gapless retina image on an eye retina.

8. The method of claim 1, further comprising aligning the retina image with a real-world scene visible through the display to form an augmented vision.

9. The method of claim 1, further comprising controlling a focusing power of the plurality of zone plates to accommodate for a vision correction need of a user of the display.

10. The method of claim 9, wherein controlling the focusing power of the plurality of zone plates comprises applying customized chirp distributions to one or more sets of electrodes.

11. An apparatus for generating a retina image by modulating optics in a display having a liquid crystal plate, comprising:
a plurality of circular zone plates in the liquid crystal plate, wherein electric fields are established between a plurality of electrode sets on a first side of the liquid crystal plate and an electrode set on a second side of the liquid crystal plate to form the zone plates, each zone plate having a center, wherein the centers of the plurality of zone plates are aligned along a first axis of the display, and the centers of the plurality of zone plates are offset from each other relative to a second axis of the display different from the first axis of the display such that at least two of the plurality of zone plates at least partially overlap; and means for moving, by repositioning electric fields through the liquid crystal plate, the plurality of zone plates in a first direction along the second axis of the display while maintaining alignment of the centers of the plurality of zone plates along the first axis.

12. The apparatus of claim 11, wherein the electrodes of the plurality of electrode sets on the first side are substantially orthogonal to the electrodes of the electrode set on the second side.

13. The apparatus of claim 11, wherein the electric fields are established by:
applying a set of voltages of varying values to each of the plurality of electrode sets on the first side; and
applying a set of voltages of varying values to the electrode set on the second side.

14. The apparatus of claim 13, wherein:
each set of voltages applied to an electrode set defines a chirp distribution having a chirp center corresponding to a voltage applied to a first-side center electrode, in the case of voltages applied to electrode sets on the first side, or a voltage applied to a second-side center electrode in the case of voltages applied to the electrode set on the second side; and
the intersection of the first-side center electrode and the second-side center electrode defines a respective center for one of the plurality of zone plates.

15. The apparatus of claim 14, wherein the means for moving the plurality of zone plates is configured to shift at least one chirp distribution applied to an electrode set on the first side so that a corresponding first-side chirp center changes, while maintaining the chirp distribution applied to the electrode set on the second side so that the second-side chirp center is unchanged.

16. The apparatus of claim 14, wherein the means for moving the plurality of zone plates is configured to shift the chirp distribution applied to the electrode set on the second side so that the second-side chirp center changes.

17. The apparatus of claim 11, wherein the means for moving the plurality of zone plates is configured to move the zone plates at intervals sufficient to form a gapless retina image on an eye retina.

18. The apparatus of claim 11, further comprising means for aligning the retina image with a real-world scene visible through the display to form an augmented vision.

19. The apparatus of claim 11, further comprising means for controlling a focusing power of the plurality of zone plates to accommodate for a vision correction need of a user of the display.

20. The apparatus of claim 19, wherein the means for controlling the focusing power of the plurality of zone plates is configured to applying customized chirp distributions to one or more sets of electrodes.

21. An apparatus for generating a retina image by modulating optics in a retina display having a liquid crystal plate, comprising:
a memory; and
at least one processor coupled to the memory and configured to:
establish electric fields between a plurality of electrode sets on a first side of the liquid crystal plate and an electrode set on a second side of the liquid crystal plate to form a plurality of circular zone plates in the liquid crystal plate, each zone plate having a center, wherein the centers of the plurality of zone plates are aligned along a first axis of the display, and the centers of the plurality of zone plates are offset from each other relative to a second axis of the display different from the first axis of the display such that at least two of the plurality of zone plates at least partially overlap; and move, by repositioning electric fields through the liquid crystal plate, the plurality of zone plates in a first direction along the second axis of the display while maintaining alignment of the centers of the plurality of zone plates along the first axis.

22. The apparatus of claim 21, wherein the electrodes of the plurality of electrode sets on the first side are substantially orthogonal to the electrodes of the electrode set on the second side.

23. The apparatus of claim 21, wherein the processing system is configured to establish electric fields by:
applying a set of voltages of varying values to each of the plurality of electrode sets on the first side; and
applying a set of voltages of varying values to the electrode set on the second side.

24. The apparatus of claim 23, wherein:
each set of voltages applied to an electrode set defines a chirp distribution having a chirp center corresponding to a voltage applied to a first-side center electrode, in the case of voltages applied to electrode sets on the first side, or a voltage applied to a second-side center electrode in the case of voltages applied to the electrode set on the second side; and
the intersection of the first-side center electrode and the second-side center electrode defines a respective center for one of the plurality of zone plates.

25. The apparatus of claim 24, wherein the processing system is configured to move the plurality of zone plates by shifting at least one chirp distribution applied to an electrode set on the first side so that a corresponding first-side chirp center changes, while maintaining the chirp distribution applied to the electrode set on the second side so that the second-side chirp center is unchanged.

26. The apparatus of claim 24, wherein the processing system is configured to move the plurality of zone plates by shifting the chirp distribution applied to the electrode set on the second side so that the second-side chirp center changes.

27. The apparatus of claim 21, wherein the processing system is configured to move the zone plates at intervals sufficient to form a gapless retina image on an eye retina.

28. The apparatus of claim 21, wherein the processing system is further configured to align the retina image with a real-world scene visible through the display to form an augmented vision.

29. The apparatus of claim 21, wherein the processing system is further configured to control a focusing power of the plurality of zone plates to accommodate for a vision correction need of a user of the display.

30. The apparatus of claim 29, wherein the processing system is further configured to control the focusing power of the plurality of zone plates by applying customized chirp distributions to one or more sets of electrodes.

31. A non-transitory computer-readable medium storing computer executable code for generating a retina image by modulating optics in a retina display having a liquid crystal plate, comprising code for:

establishing electric fields between a plurality of electrode sets on a first side of the liquid crystal plate and an electrode set on a second side of the liquid crystal plate to form a plurality of circular zone plates in the liquid crystal plate, each zone plate having a center, wherein the centers of the plurality of zone plates are aligned along a first axis of the display, and the centers of the plurality of zone plates are offset from each other relative to a second axis of the display different from the first axis of the display such that at least two of the plurality of zone plates at least partially overlap; and moving, by repositioning electric fields through the liquid crystal plate, the plurality of zone plates in a first direction along the second axis of the display while maintaining alignment of the centers of the plurality of zone plates along the first axis.

32. The computer-readable medium of claim 31, wherein the electrodes of the plurality of electrode sets on the first side are substantially orthogonal to the electrodes of the electrode set on the second side.

33. The computer-readable medium of claim 31, further comprising code for:
applying a set of voltages of varying values to each of the plurality of electrode sets on the first side; and
applying a set of voltages of varying values to the electrode set on the second side.

34. The computer-readable medium of claim 33, wherein:
each set of voltages applied to an electrode set defines a chirp distribution having a chirp center corresponding to a voltage applied to a first-side center electrode, in the case of voltages applied to electrode sets on the first side, or a voltage applied to a second-side center electrode in the case of voltages applied to the electrode set on the second side; and
the intersection of the first-side center electrode and the second-side center electrode defines a respective center for one of the plurality of zone plates.

35. The computer-readable medium of claim 34, further comprising code for shifting at least one chirp distribution applied to an electrode set on the first side so that a corresponding first-side chirp center changes, while maintaining the chirp distribution applied to the electrode set on the second side so that the second-side chirp center is unchanged.

36. The computer-readable medium of claim 34, further comprising code for shifting the chirp distribution applied to the electrode set on the second side so that the second-side chirp center changes.

37. The computer-readable medium of claim 31, comprising code for moving the zone plates at intervals sufficient to form a gapless retina image on an eye retina.

38. The computer-readable medium of claim 31, comprising code for aligning the retina image with a real-world scene visible through the display to form an augmented vision.

39. The computer-readable medium of claim 31, comprising code for controlling a focusing power of the plurality of zone plates to accommodate for a vision correction need of a user of the display.

40. The computer-readable medium of claim 39, further comprising code for applying customized chirp distributions to one or more sets of electrodes to control the focusing power.

* * * * *